United States Patent Office 2,731,529
Patented Jan. 17, 1956

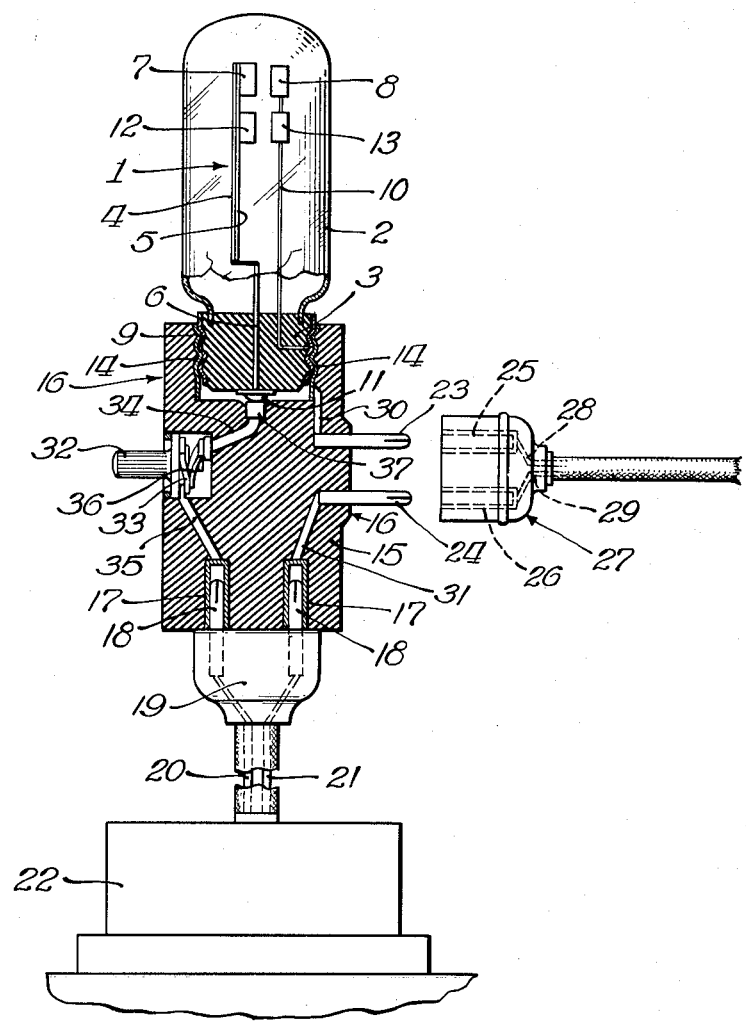

2,731,529

AUTOMATIC CONTROL DEVICE

Oscar J. Leins, Milwaukee, Wis., assignor to Milwaukee Gas Specialty Company, Milwaukee, Wis., a corporation of Wisconsin Application December 13, 1950, Serial No. 200,614

3 Claims. (Cl. 200—138)

This invention relates, in general, to an automatic control device, and has particular relation to an automatic control device for portable electric heaters, although its use with heaters which are not portable and with cooling devices is contemplated within the scope of the present invention.

One of the main objects of the invention is to provide an improved form of automatic control device of simple and inexpensive construction and which is operable simply and effectively to control the heater by changes in temperature of a room or other space or medium heated by the heater; also manually to control the supply of electric current to the heater or heater operating circuit.

Another object of the invention is to provide in combination with an improved form of capsulated thermostat for controlling the heater, an improved form of connector for connecting the thermostat in circuit with a source of electric energy or power for operating the heater; also in circuit with the heater, and having a switch for manual control of the heater circuit.

Other objects and advantages of the invention and numerous adaptations of the invention will be apparent from the following detailed description and the accompanying drawing.

In the drawing the single figure is a diagrammatic view of one illustrative embodiment of the invention.

Referring to the drawing, the control device selected for illustration comprises a thermostat 1 enclosed within a sealed envelope or capsule 2 provided with an insulating base 3.

The thermostat 1 is shown in the form of a bimetallic member comprising two strips 4 and 5 of different metals or other thermostat materials, such, for example, as brass and steel, securely fastened together. One end of the thermostat 1 is fixed, for example, at 6 to the base 3, and the other end of the thermostat carries a contact 7 which moves by the action of the thermostat into and out of engagement with a cooperating contact 8 also located within the envelope 2.

The base 3 of the envelope 2 has an outer conductive screw-type shell 9 connected by a conductive arm 10 to the contact 8. The arm 10 is also disposed within the envelope 2 and supports the contact 8 in the desired relation to contact 7. The base 3 also has a central contact 11 conductively connected to the thermostat 1.

If desired, one of the arms 1 and 10—such as the thermostat 1—may carry a small permanent magnet 12, and the other arm—such as arm 10—may carry an armature 13 in appropriate relation to the magnet 12. This assures snap action of contact 7 into engagement with contact 8 and snap separation of the contacts in the automatic control of the heater as will presently appear. It is contemplated within the broader aspects of the invention that the magnet 12 and armature 13 may be omitted, and, if desired, other means may be provided for snap engagement and disengagement of contacts 7 and 8.

The screw shell 9 is adapted, as well understood in the art, to be screwed into and from a screw socket formed by a screw conductive shell 14 in one end of the insulating base 15 of a connector designated in its entirety at 16. The opposite end of the base 15 has a pair of terminal sockets 17 for receiving the split contact prongs 18 of a connector plug 19 having lead conductors 20 and 21 conductively connected to the heater 22 or to a control circuit for the heater.

One side of the base 15 has a pair of projecting split contact prongs 23 and 24 adapted for quick detachable engagement with contact sockets 25 and 26 in any suitable outlet receptacle 27 as well understood in the art. Lead conductors 28 and 29 conductively connected to sockets 25 and 26 lead to any suitable source of electric energy or power (not shown), such as a household, office, or industrial electric lighting circuit. Base 15 has a conductor 30 conductively connecting prong 23 in circuit with screw socket shell 14, and a second conductor 31 conductively connecting the other prong 24 in circuit with one of the contact sockets 17.

The other side of the base 15 carries a snap switch comprising, for example, an outwardly projecting switch button 32 rotatable about its axis and carrying a contact 33 for snap bridging engagement with and disengagement from contacts 34 and 35 under the action of a spring 36. Snap switches of this type are per se well known in the art, and the switch will not be further described except to point out that the contacts 34 and 35 are mounted in base 15. Contact 34 is conductively connected in circuit with a central connector contact 37 which engages the thermostat contact 11 when the thermostat is in place. Contact 35 is conductively connected in circuit with the other terminal socket 17.

If desired, the envelope or capsule 2 may be filled with a relatively light gas of a character to conduct heat rapidly. Helium and hydrogen are suitable gases, but any light gas that conducts heat rapidly may be employed. The wall of the envelope 2 may be glass, or it may be a thin copper wall or thin wall of other good heat conducting material. These features with the capsulated thermostat provide an extremely sensitive device which responds effectively to ambient temperatures produced in the room or other space or medium by the heater 22.

With the capsulated thermostat applied to connector 16, terminals 17 connected to heater circuit 20, 21, terminals 23 and 24 connected to the source of current 28 and 29, and switch button 32 in closed position, then when thermostat contacts 7 and 8 are closed electric current will flow from one side of the source of current, for example, from conductor 23, through conductive connection 30, shell 9, arm 10, contacts 8 and 7, thermostat 1, contacts 11 and 37, switch contacts 34, 33, and 35, conductive connection 38, contact terminals 17, 18, conductor 20, the heater circuit, conductor 21, the other contact terminals 18, 17, conductive connection 31 and contact terminals 24 and 26 to the other current supply conductor 29.

At this time the flow of electric current or energy energizes or operates the heater 22 which then functions to heat the room or other space or medium in which the thermostat is located or to the temperature of which the thermostat is otherwise responsive. When contact 7 is in engagement with contact 8, armature 13 is in attracted relation to magnet 12.

As the temperature of the room or other space or medium approaches the maximum temperature, the ambient temperature (i. e., the temperature produced by the heater 22 and to which the thermostat 1 is responsive) will cause the thermostat 1 to warp in a direction to move contact 7 out of engagement with contact 8. As soon as sufficient energy is set up in thermostat 1 to overcome the holding action of magnet 12 the contact 7 snaps out of contact with contact 8. When contacts 7 and 8 are thus opened, the heater is deenergized and ceases to supply heat to the room or other space or medium.

As the temperature of the room or other space or medium cools with the heater 22 out of operation, the drop in ambient temperature will cause the thermostat 1 to warp in a direction to move contact 7 toward contact 8. Where there is a magnet 12 and armature 13 and the magnet reaches position to place it under the influence of armature 13, the contact 7 will snap into contact with contact 8, thereby closing the circuit for the flow of current for energizing or operating the heater 22 as previously described.

If it is desired to shut off the operation of the heater 22, for example, with contacts 7 and 8 closed, or with the contacts 7 and 8 open, to prevent setting the heater in operation by the thermostat 1, this may be accomplished, for example, by turning switch button 32 to snap contact 33 out of bridging contact with contacts 34 and 35. When desired, further turning of the button 32 will snap contact 33 into bridging contact with contacts 34 and 35 to close the circuit at the manual switch. While the button 32 is described as rotatable, it may be pivoted for swinging movement, or mounted for reciprocatory push-pull action, or it may be of any other suitable form.

The conductors 20 and 21 may be in the form of insulated stranded flexible conductors of the type commonly employed with small portable heaters operated by household current. It is to be understood, however, that these conductors and the other conductors may be in the form of any other desired conductive connections. The receptacle 27 may be in the form of the usual electric outlet receptacle commonly provided in the walls of a room, or it may be of any other suitable or preferred form. While the terminal connectors between the capsulated thermostat and the connector 16 are shown of screw shell type, it is to be understood that they may be of the prong and socket type, or of other desired form. The terminal connectors 23, 24 and cooperating terminal connectors 25 and 26, and the terminal connectors 17 and their cooperating terminal connectors 18, may also be of other forms than the prong and socket type shown in the drawing.

It is contemplated within the scope of this invention that where different control temperatures are desired, or if cooling control rather than heating control is desired, different preset devices may be inserted into the receptacle.

The embodiment of the invention shown in the drawing is for illustrative purposes only, and it is to be expressly understood that said drawings and the accompanying specification are not to be construed as a definition of the limits or scope of the invention, reference being had to the appended claims for that purpose.

I claim:

1. In a temperature responsive control, a connector block having a first pair of plug-in terminals for plug-in connection with a source of electricity, said block also having a second pair of plug-in terminals for plug-in connection therewith of an electrically powered heat generating device, said block also being provided with a pair of contacts and having means including a manual switch for connecting said pairs of terminals and said pair of contacts in series circuit relation, and a thermostat removably mounted on said block and comprising a sealed envelope, said thermostat having a base affording quick detachable plug-in connection of the contacts thereof with the contacts of said block, wherefore the current flow from said source to an electrically powered device connected thereto can be interrupted by either said manual switch or said thermostat.

2. In a temperature responsive control, a connector block having a first pair of plug-in terminals for plug-in connection with a source of electricity, said block also having a second pair of plug-in terminals for plug-in connection therewith of an electrically powered heat generating device, a thermostat removably connected to said block in series circuit relation with said pairs of terminals, said thermostat comprising a sealed envelope, a thermostatic arm disposed within said sealed envelope and carrying a first contact, a non-thermostatic arm disposed within said sealed envelope and carrying a second contact for engagement with and separation from said first contact by response of said thermostatic arm to variations in temperature, said thermostat having a base affording quick detachable connection of the contacts thereof in said series circuit, wherefore the current flow from said source to an electrically powered device connected thereto is under the control of said thermostat.

3. In a temperature responsive control, a connector block having a first pair of plug-in terminals for plug-in connection with a source of electricity, said block also having a second pair of plug-in terminals for plug-in connection therewith of an electrically powered heat generating device, said block also being provided with a pair of contacts and having means including a manual switch for connecting said pairs of terminals and said pair of contacts in series circuit relation, and a thermostat removably mounted on said block and comprising a sealed envelope, a thermostatic arm disposed within said sealed envelope and carrying a first contact, a non-thermostatic arm disposed within said sealed envelope and carrying a second contact for contact with and separation from said first contact by response of said thermostatic arm to variations in temperature, and magnetic snap-acting means for said contacts disposed wholly within the sealed envelope and comprising a permanent magnet carried by one of said arms and a magnetic member carried by the other arm, said thermostat having a base affording quick detachable plug-in connection of the contacts thereof with the contacts of said block, wherefore the current flow from said source to an electrically powered device connected thereto is under the dual control of said manual switch and thermostat and can be interrupted by either of said switch or thermostat.

References Cited in the file of this patent

UNITED STATES PATENTS

| Number | Name | Date |
| --- | --- | --- |
| 1,303,464 | Davis | May 13, 1919 |
| 1,556,111 | Herskovitz | Oct. 6, 1925 |
| 1,755,612 | Runsvold | Apr. 22, 1930 |
| 2,149,853 | McCabe | Mar. 7, 1939 |
| 2,180,701 | Wilson | Nov. 21, 1939 |
| 2,434,909 | Curtis | Jan. 27, 1948 |
| 2,467,018 | Eggleston | Apr. 12, 1949 |
| 2,480,827 | Armstrong | Sept. 6, 1949 |
| 2,519,025 | Crise | Aug. 15, 1950 |
| 2,527,108 | Szabo | Oct. 24, 1950 |

FOREIGN PATENTS

| Number | Country | Date |
| --- | --- | --- |
| 221,708 | Switzerland | Sept. 1, 1942 |
| 362,542 | Germany | Oct. 28, 1922 |
| 424,014 | Great Britain | Feb. 13, 1935 |
| 608,166 | France | Apr. 17, 1926 |